United States Patent
Takatori

(10) Patent No.: US 7,609,656 B2
(45) Date of Patent: Oct. 27, 2009

(54) BRIDGE DEVICE, METHOD OF CONTROLLING BRIDGE DEVICE, AND CONTROL PROGRAM

(75) Inventor: Ko Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 11/498,387

(22) Filed: Aug. 3, 2006

(65) Prior Publication Data
US 2007/0230366 A1 Oct. 4, 2007

(30) Foreign Application Priority Data
Mar. 31, 2006 (JP) ............... 2006-097544

(51) Int. Cl.
*H04L 12/28* (2006.01)
*H04L 12/56* (2006.01)
*G06F 13/00* (2006.01)

(52) U.S. Cl. ................. 370/254; 370/401; 710/316

(58) Field of Classification Search ......... 307/400–402, 307/408, 254, 256, 258, 238; 710/316
See application file for complete search history.

(56) References Cited

U.S. PATENT DOCUMENTS

| 5,018,133 | A * | 5/1991 | Tsukakoshi et al. ......... 370/256 |
| 6,795,403 | B1 * | 9/2004 | Gundavelli ................ 370/256 |
| 6,801,506 | B1 * | 10/2004 | Dey ......................... 370/256 |
| 7,471,647 | B2 * | 12/2008 | Ge et al. .................... 370/256 |
| 2001/0021177 | A1 * | 9/2001 | Ishii ......................... 370/256 |
| 2002/0046271 | A1 * | 4/2002 | Huang ....................... 709/223 |
| 2004/0136347 | A1 * | 7/2004 | Fuke et al. .................. 370/338 |
| 2004/0190454 | A1 * | 9/2004 | Higasiyama ................ 370/238 |
| 2005/0138008 | A1 * | 6/2005 | Tsillas .......................... 707/3 |
| 2005/0259597 | A1 * | 11/2005 | Benedetto et al. ........... 370/254 |
| 2006/0206656 | A1 * | 9/2006 | Di Benedetto et al. ...... 710/316 |
| 2007/0025258 | A1 * | 2/2007 | Chen ......................... 370/241 |

FOREIGN PATENT DOCUMENTS

JP  2004-112724  4/2004

* cited by examiner

*Primary Examiner*—Ayaz R Sheikh
*Assistant Examiner*—Hoang-Chuong Q Vu
(74) *Attorney, Agent, or Firm*—Katten Muchin Rosenman LLP

(57) ABSTRACT

The bridge device is connected to a layer-2 network. The Query message distribution unit discriminates, distributes, and outputs the normal Query messages and abnormal Query messages among the received Query messages. The abnormal message processing unit counts the number of received abnormal Query messages, and the normal message processing unit counts the number of normal Query messages. The router connection state judgment unit judges that the bridge device is a bridge device that is adjacent to the router when only the number of normal Query messages is counted and outputs an instruction to change the bridge ID to the STP processing unit. The STP processing unit establishes the bridge ID as a minimum value and renders the bridge device a root bridge.

11 Claims, 10 Drawing Sheets

FIG.3A

| TYPE | MAX RESP TIME | CHECKSUM |
|---|---|---|
| GROUP ADDRESS | | |

IGMP MESSAGE FORMAT

FIG.3B

| 0x11 | 0 ~ 0xff | CHECKSUM (=CORRECT CALCULATION VALUE) |
|---|---|---|
| 0 ~ 0xffffffff | | |

NORMAL QUERY MESSAGE

FIG.3C

| 0x11 | 0 ~ 0xff | CHECKSUM (≠CORRECT CALCULATION VALUE) |
|---|---|---|
| 0 ~ 0xffffffff | | |

ABNORMAL QUERY MESSAGE

MLD MESSAGE FORMAT

NORMAL QUERY MESSAGE

ABNORMAL QUERY MESSAGE

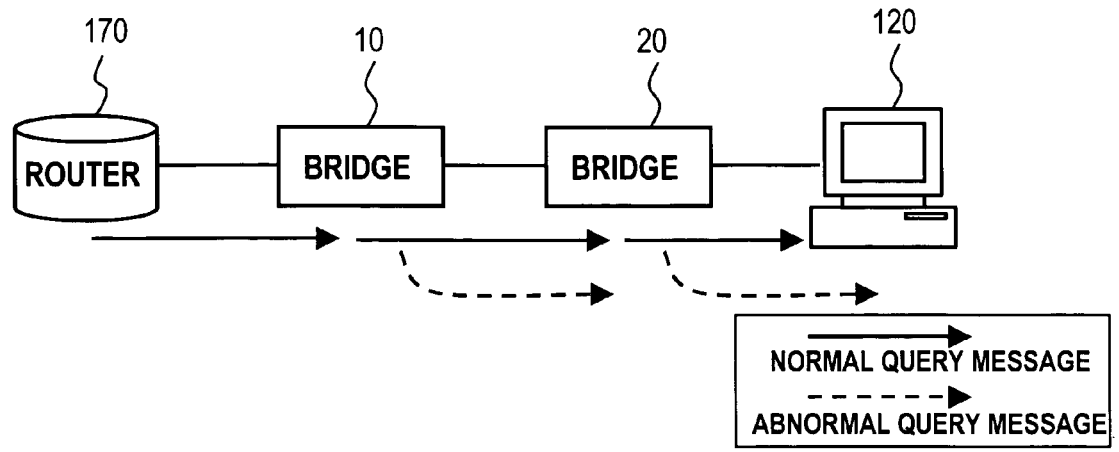
FIG.5A FLOW OF QUERY MESSAGE
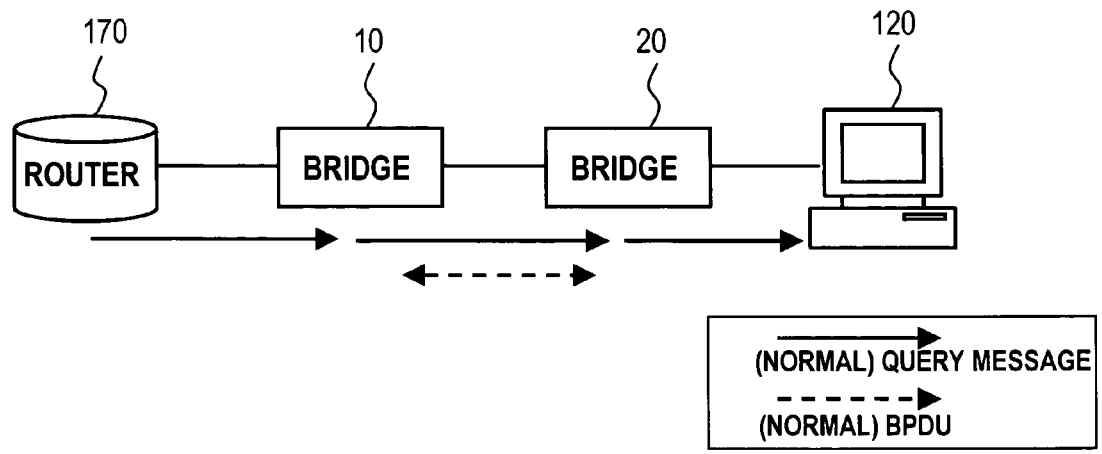
FIG.5B FLOW OF QUERY MESSAGE AND BPDU

FIG.7   EXAMPLE OF BPDU FORMAT

| PARAMETER | BYTE | DESCRIPTION |
|---|---|---|
| PROTOCOL ID | 2 | NORMAL IS 0 |
| PROTOCOL VERSION ID | 1 | LARGER VERSION ID IS NEW PROTOCOL VERSION. NORMAL IS 0 |
| BPDU TYPE | 1 | ONLY USED FOR IDENTIFICATION OF TYPE. NO ORDER RELATIONSHIP BETWEEN BPDUs WITH DIFFERENT TYPES. Conf BPDU=0x00 |
| FLAGS | 1 | FIRST BIT = TC FLAG, EIGHTH BIT = TC ACK FLAG |
| ROOT ID | 8 | BRIDGE ID OF ROOT |
| ROOT PATH COST | 4 | PATH COST TOTAL FROM ROOT |
| BRIDGE ID | 8 | SMALLER NUMBERS REPRESENT PRIORITY. UPPER FOUR BITS ARE PRIORITY ELEMENTS THAT CAN BE SET. FOLLOWING TWELVE BITS ARE SYSTEM ID EXTENSION. LOWER SIX BYTES EMPLOY A NORMAL MAC ADDRESS IN ORDER TO REPRESENT UNIQUENESS OF BRIDGE ID |
| PORT ID | 2 | SMALLER NUMBERS REPRESENT PRIORITY. UPPER FOUR BITS ARE PRIORITY ELEMENTS THAT CAN BE SET. LOWER TWELVE BITS REPRESENT PORT NUMBER. 0 IS NOT USED FOR PORT NUMBER. |
| MESSAGE AGE | 2 | BPDU LIFETIME. 1/256 SECOND UNIT. 0 TO 256 SECONDS |
| MAX AGE | 2 | MAXIMUM LIFETIME OF ROOT INFORMATION. 1/256 SECOND UNIT. 0 TO 256 SECONDS |
| HELLO TIME | 2 | BPDU TRANSMISSION INTERVAL. 1/256 SECOND UNIT. 0 TO 256 SECONDS |
| FORWARD DELAY | 2 | TIME FOR STATE TRANSITION. 1/256 SECOND UNIT. 0 TO 256 SECONDS |

BRIDGE DEVICE, METHOD OF CONTROLLING BRIDGE DEVICE, AND CONTROL PROGRAM

CROSS-REFERENCE TO RELATED APPLICATIONS

This application is based upon and claims the benefit of priority from the prior Japanese Patent Application No. 2006-97544, filed on Mar. 31, 2006, the entire contents of which are incorporated herein by reference.

BACKGROUND OF THE INVENTION

1. Field of the Invention

The present invention relates to each of bridge devices in a layer-2 network, a method of controlling the bridge devices, and a control program, and, more particularly, to a bridge device or the like of a layer-2 network that permits the efficient transfer of multicast data.

2. Description of the Related Art

Conventionally, there is a technology that data are distributed by multicasting such as the distribution of moving images to a fixed user terminal connected to a network.

In order to efficiently construct such a network, a multicast routing protocol such as MLD (Multicast Listener Discovery Protocol) that corresponds with IPv6 (Internet Protocol Version 6) and IGMP (Internet Group Management Protocol) that corresponds with IPv4 (Internet Protocol Version 4) is used between the router and host.

In IGMP and MLD, a router sends a Query message at regular intervals and, when a terminal that has received this message wishes to receive multicast data, the terminal sends a Report message to the router. Thereafter, the router confirms the existence of a subordinate multicast reception terminal from the existence of the Report message. The router transfers multicast data of the interface to which the multicast reception terminal is connected only when the multicast reception terminal exists. As a result, an effective application of network resources can be attempted.

Meanwhile, when the network that connects the router and host is a so-called layer-2 network constituted by a plurality of bridge devices, redundant control by a protocol known as STP (Spanning Tree Protocol) is performed within the network.

STP is a protocol standardized by the IEEE (Institute of Electrical and Electronic Engineers) 802.1D. STP is a protocol that uniquely determines a path between bridge devices by suppressing a data frame relay via a predetermined port when a physical redundant path is held between optional bridge devices on the network More precisely, the path is determined as follows. That is, a control packet known as a BPDU (Bridge Protocol Data Unit) is sent and received between bridge devices and the bridge device having the smallest bridge ID is determined as a root bridge device.

Further, the route is set in a tree shape from the root bridge device to the respective bridge devices and the transfer of data to a path (links) other than this path is broken. As a result, the path between optional bridge devices connected to the network is uniquely determined.

When two or more routes exist between optional bridge devices, the path is determined by selecting the path with the smallest cost (value corresponding with the bandwidth of the network) and breaking the other path.

FIG. 10 shows a constitutional example of a layer-2 network and shows an aspect in which the path is determined by the STP above and multicast data is transferred.

Each of the bridge devices 210 to 250 are mutually connected to a network 100 and the respective bridge devices 210 to 250 are each connected to their respective hosts 110 to 150. A router 170 is connected between the host 110, which is a multicast transmission terminal, and the bridge device 210.

In the case of this example, the bridge 230 is set as a root bridge and a path X between the bridge device 210 and bridge device 250 is broken. Further, because path X is broken when multicast data are transferred from the host 110 to the host 150, data are transferred from the bridge device 210 via the bridge device 220 and so forth.

Conventional technology relating to the transfer of such multicast data includes technology in which two ports connected to either the router or the adjacent switch are set as uplink paths whereby multicast data are always transmitted, and a transmission route between ports is controlled on the basis of a multicast filter table created on the basis of the port receiving a participation message (Japanese Patent Application Laid Open No. 2004-112724, for example).

However, STP determines the root bridge and the break point without conscious of which path the multicast data is communicated, especially conscious of where the router is disposed on the network.

Therefore, when the path shown in FIG. 10 is determined, data is transferred to the bridge device 220 or the like without path X being used. Hence, the usage efficiency of the network 100 becomes very poor. In the case of large-capacity data, such a moving image and so on, the transfer of data to and from another host is sometimes also delayed.

Further, when the path shown in FIG. 10, for example, is also determined by using the multicast filter table created on the basis of participation messages as per Japanese Patent Application Laid Open No. 2004-112724 above, the exact same problems exist.

SUMMARY OF THE INVENTION

Therefore, the present invention is conceived in view of these problems and an object thereof is to provide a bridge device that generates an efficient transfer route in a layer-2 network and increases the usage efficiency, a method of controlling the bridge device, and a control program.

In order to achieve the above object, a first embodiment of the present invention is a bridge device in a layer-2 network, having: a setting unit which sets the bridge device as a root bridge by making a bridge ID of the bridge device smaller than the bridge IDs of other bridge devices when the bridge device is adjacent to a router connected to the layer-2 network.

Further, an another embodiment of the present invention is the bridge device, further having: a message transmission unit which transmits an abnormal Query message together with a normal Query message to the other bridge devices, with respect to the Query message representing a message for confirming whether or not there is participation in a multicast group that is sent by the router, Further, an another embodiment of the present invention is the bridge device, wherein the message transmission unit transmits a control message that is used in order to judge whether or not the bridge device is adjacent to the router, instead of the abnormal Query message.

Further, an another embodiment of the present invention is the bridge device, further having: a router connection state judgment unit which judges whether or not the bridge device is adjacent to the router by comparing, with respect to a Query message representing a message for confirming whether or not there is participation in a multicast group that is sent by the router, a first reception number indicating the number of normal Query messages received and a second reception number indicating the number of abnormal Query messages received, and which outputs an instruction to change the bridge ID when judged that the bridge device is adjacent to the router.

Further, an another embodiment of the present invention is the bridge device, wherein the router connection state judgment unit judges that the bridge device is adjacent to the router when only the first reception number is counted.

Further, an another embodiment of the present invention is the bridge device, wherein the router connection state judgment unit judges that the bridge device is not adjacent to the router when the first reception number and the second reception number are counted as having substantially the same count number.

Further, an another embodiment of the present invention is the bridge device, further having: a router connection state judgment unit that judges whether or not the bridge device is adjacent to the router on the basis of the reception history of a BPDU which is transferred between the bridge devices and represents a control packet that stores data including the bridge ID.

Further, an another embodiment of the present invention is the bridge device, wherein the router connection state judgment unit receives only a Query message representing a message for confirming whether or not there is participation in a multicast group that is sent from the router and judges that the bridge device is adjacent to the router when the BPDU is not received from the reception history.

Further, an another embodiment of the present invention is the bridge device, wherein the router connection state judgment unit judges that the bridge device is not adjacent to the router when both a Query message and the BPDU are received.

Further, in order to achieve the above object, an another embodiment of the present invention is a method of controlling a bridge device in a layer-2 network, having a step of setting the bridge device as a root bridge by making a bridge ID of the bridge device smaller than the bridge IDs of other bridge devices when the bridge device is adjacent to a router that is connected to the layer-2 network.

Further, in order to achieve the above object, an another embodiment of the present invention is a control program that causes a computer to execute a setting processing which sets a bridge device as a root bridge by making a bridge ID of the bridge device smaller than the bridge IDs of other bridge devices when the bridge device in a layer-2 network is adjacent to a router connected to the layer-2 network.

Further, in order to achieve the above object, an another embodiment of the present invention is a layer-2 network, having: a router and a plurality of bridge devices, wherein the bridge device that is adjacent to the router among the plurality of bridge devices is set as a root bridge by making a bridge ID of the bridge device smaller than the bridge IDs of other bridge devices.

Further, in order to achieve the above object, an another embodiment of the present invention is a bridge device in a layer-2 network, having: a setting unit which sets the bridge device as a root bridge by storing an ID that is smaller than the bridge IDs of other bridge devices in a region where a root ID of a BPDU is stored when the bridge device is adjacent to a router connected to the layer-2 network.

Further, an another embodiment of the present invention is the bridge device, further having: a router connection state judgment unit which judges whether or not the bridge device is adjacent to the router by comparing, with respect to a Query message that represents a message for confirming whether or not there is participation in a multicast group that is sent by the router, a first reception number indicating the number of normal Query messages received and a second reception number indicating the number of abnormal Query messages received.

Further, in order to achieve the above object, an another embodiment of the present invention is a method of controlling a bridge device in a layer-2 network, having a step of setting the bridge device as a root bridge by storing an ID that is smaller than the bridge IDs of other bridge devices in a region where a root ID of a BPDU is stored when the bridge device is adjacent to a router connected to the layer-2 network.

Further, in order to achieve the above object, an another embodiment of the present invention is a control program that causes a computer to execute: a setting processing which sets a bridge device as a root device by storing an ID that is smaller than the bridge IDs of other bridge devices in a region where a root ID of a BPDU is stored, when the bridge device in a layer-2 network is adjacent to a router connected to the layer-2 network.

Further, in order to achieve the above object, an another embodiment of the present invention is a layer-2 network having: a router, and a plurality of bridge devices, wherein the bridge device that is adjacent to the router among the plurality of bridge devices is set as a root bridge by storing an ID that is smaller than the bridge IDs of other bridge devices in a region where a root ID of a BPDU is stored.

The present invention is capable of providing a bridge device that generates an efficient transfer route in a layer-2 network and increases the usage efficiency, a method of controlling a bridge device, and a control program.

BRIEF DESCRIPTION OF THE DRAWINGS

FIG. 3A shows an example of the IGMP message format, FIG. 3B shows an example of a normal Query message, and FIG. 3C shows an example of an abnormal message;

FIG. 5A shows the flow of a Query message and FIG. 5B shows the flow of a Query message and a BPDU;

FIG. 7 shows an example of the BPDU format;

DESCRIPTION OF THE PREFERRED EMBODIMENTS

Preferred embodiments for the present invention will be described hereinbelow with reference to the drawings.

Figure 1:
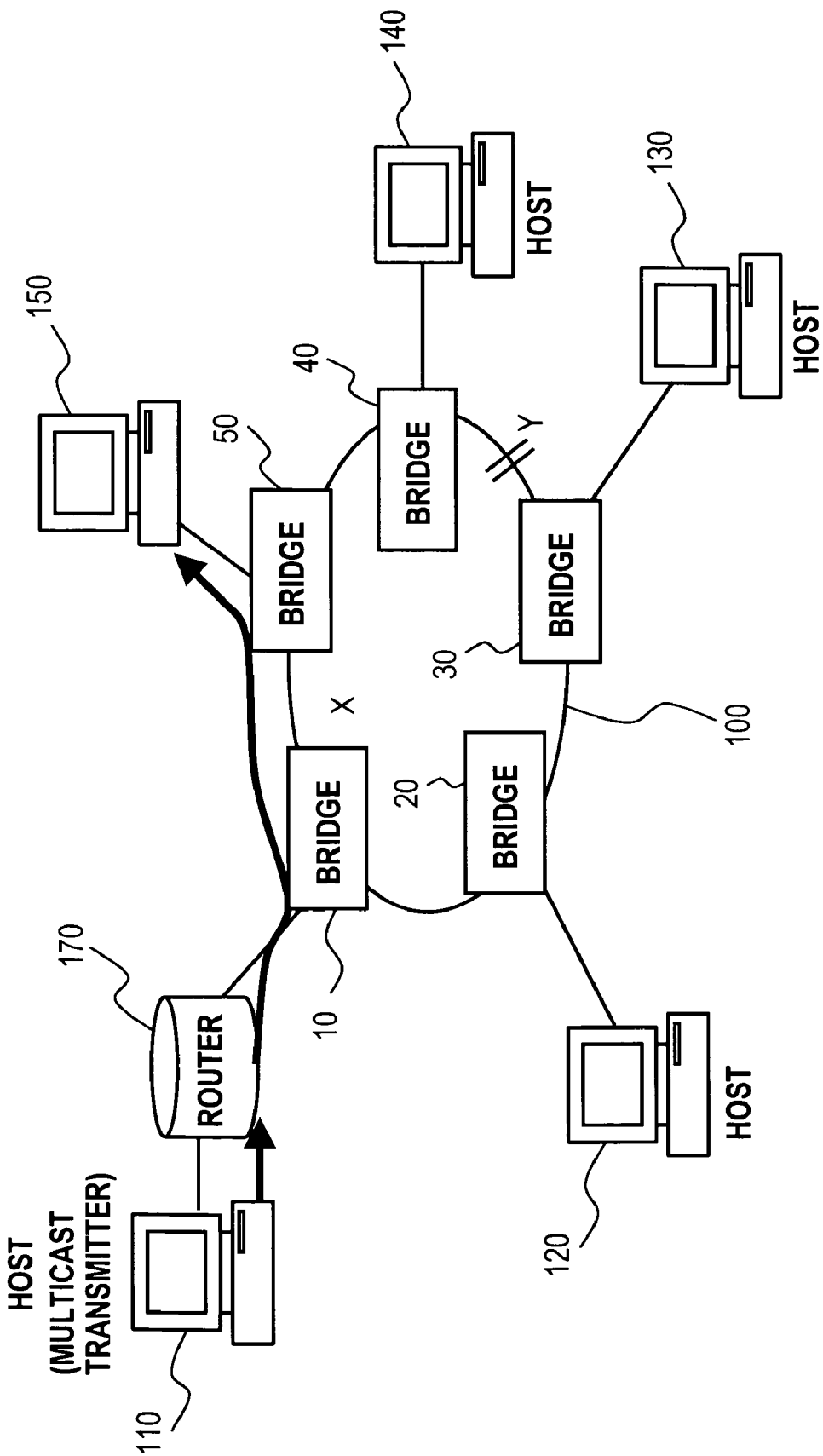
FIG. 1 shows a constitutional example of an entire network.

FIG. 1 is a constitutional example of a layer-2 network that has bridge devices 10 to 50 to which the present invention is applied.

Each of the bridge devices 10 to 50 is connected in a ring shape to the network 100. The respective bridge devices 10 to 50 are connected to the hosts 110 to 150 respectively. Further, a router 170 is connected between the host 110 and bridge device 10.

Further, the network 100 connecting the router 170 to the hosts 120 to 150 of this embodiment is a so-called layer-2 network constituted by a plurality of bridge devices 10 to 50.

Figure 2:
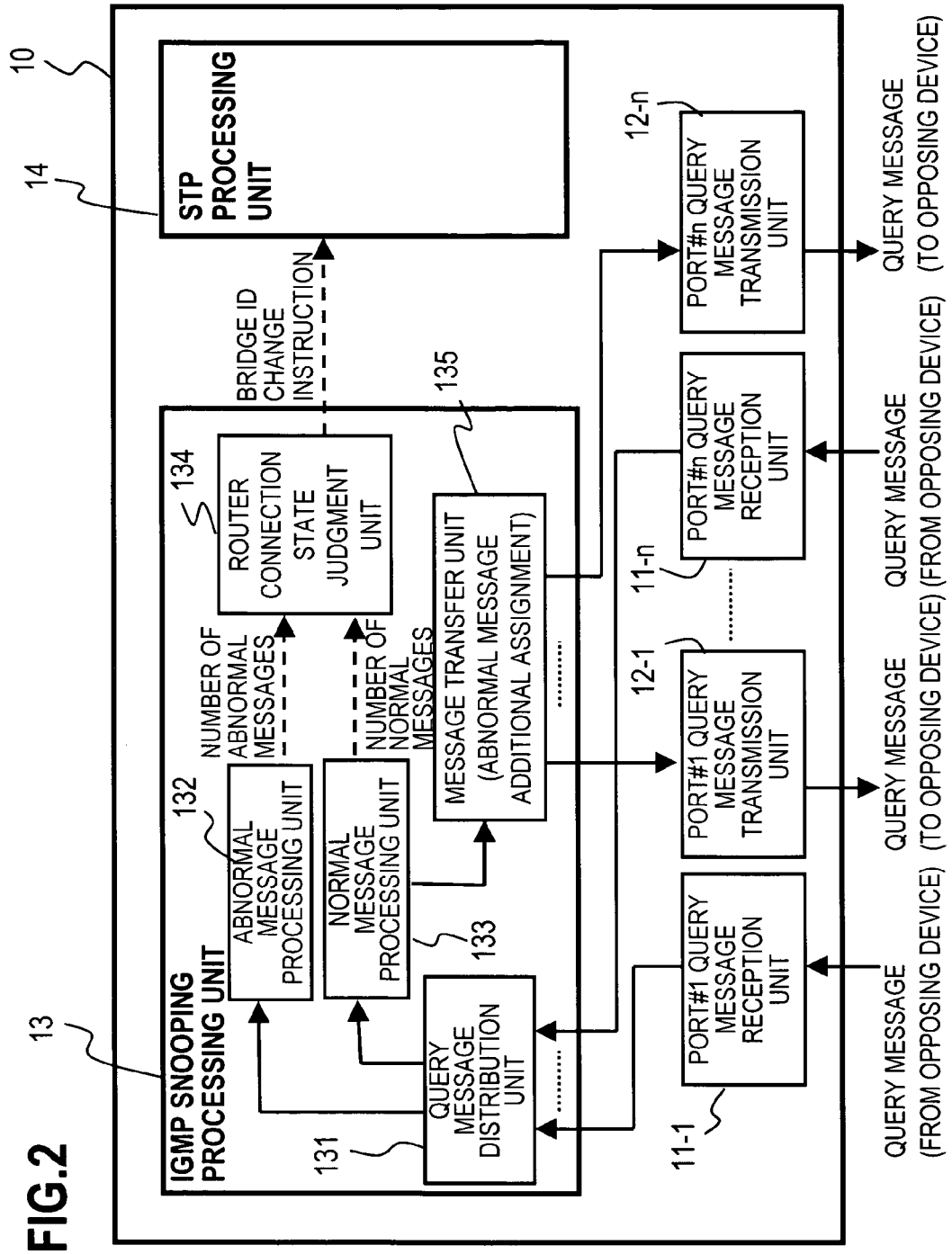
FIG. 2 shows a constitutional example of a bridge device.

FIG. 2 shows a constitutional example of the bridge device 10. The other bridge devices 20 to 50 also have the same constitution.

The bridge device 10 has Query message reception units 11-1 to 11-n, Query message transmission units 12-1 to 12-n, an IGMP snooping processing unit 13, and an STP processing unit 14.

The Query message reception units 11-1 to 11-n receive Query messages from the adjacent devices (the bridge devices 20 and 50 that are adjacent to the bridge device 10 or the router 170 that is adjacent to the bridge device 10). The Query message reception units 11-1 to 11-n exist for each port of the bridge device 10. In the example of FIG. 2, n (n is an integer of two or more) reception units 11-1 to 11-n exist.

Further, the Query message is transmitted from the router 170 to each of the bridge devices 10 to 50 and is therefore a message for confirming whether each of the hosts 110 to 150 is participating in a multicast group.

The Query message transmission units 12-1 to 12-n transmit the Query message to the adjacent devices (the bridge devices 20 and 50). Likewise, there is an equivalent number of ports. n exist in the example in FIG. 2.

The IGMP snooping processing unit 13 has a Query message distribution unit 131, an abnormal message processing unit 132, a normal message processing unit 133, a router connection state judgment unit 134, and a message transfer unit 135.

The Query message distribution unit 131 is connected to the message reception units 11-1 to 11-n of the respective ports and judges whether the received Query message is abnormal or normal. Further, the Query message distribution unit 131 outputs abnormal messages to the abnormal message processing unit 132 and normal messages to the normal message processing unit 133, on the basis of the judgment result.

The Query message distribution unit 131 judges whether the Query message is a normal message or an abnormal message as follows.

FIG. 3A shows an example of the IGMP message format. The IGMP message format is constituted by a 'Type' field indicating the type of message, a 'MaxResp (Response) Time' field indicating the standby time permitted for the transmission of a response report, a 'Checksum' indicating one complement of sixteen bits of a total of complements of one of the IGMP message (the total value of the values stored in fields other than the 'Checksum' field, for example), and a 'Group Address' indicating a group address or the like.

In the case of the normal Query message, as shown in FIG. 3B, a normal calculation value is stored in the 'Checksum' field and, in the case of the abnormal Query message, as shown in 3C, a calculation value that is not correct is stored in the 'Checksum' field.

The Query message distribution unit 131 calculates the values contained in fields other than the 'Checksum' field of the received Query message and judges whether the calculation result matches the value stored in the 'Checksum' field. In the event of a match, the Query message is judged to be normal and, in the event of no match, the Query message is judged to be abnormal.

Figure 4A:
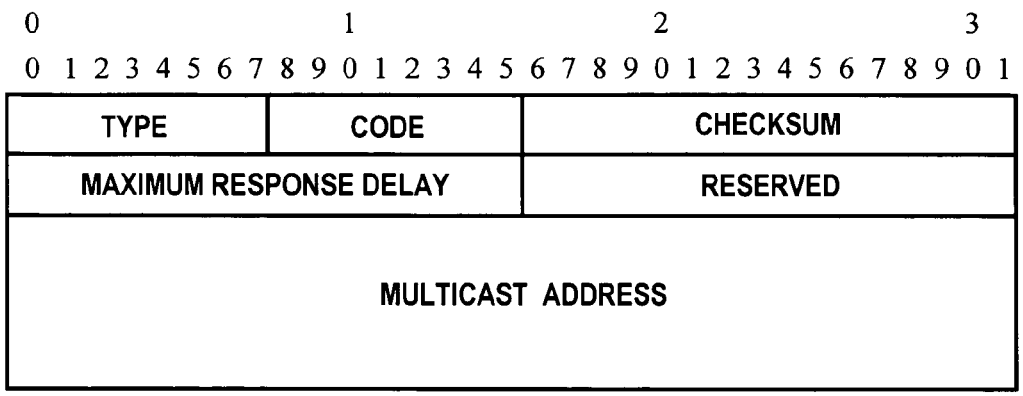
FIG. 4A shows an example of the MLD message format.
Figure 4B:
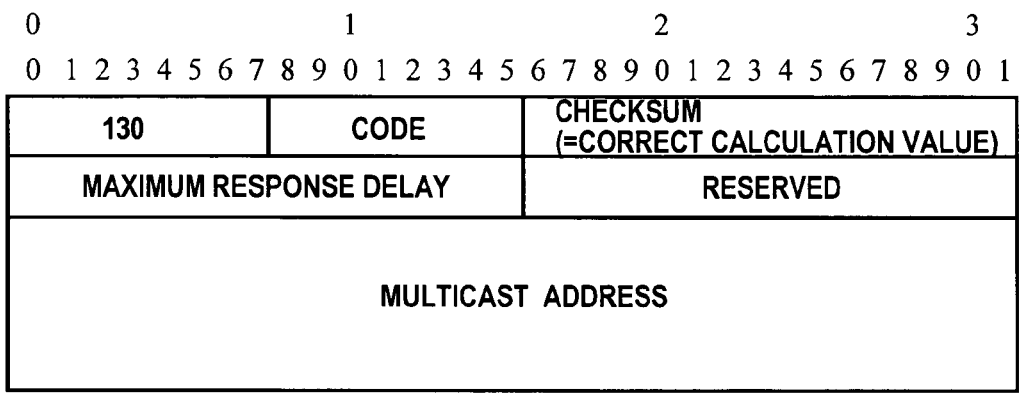
FIG. 4B shows an example of a normal Query message.
Figure 4C:
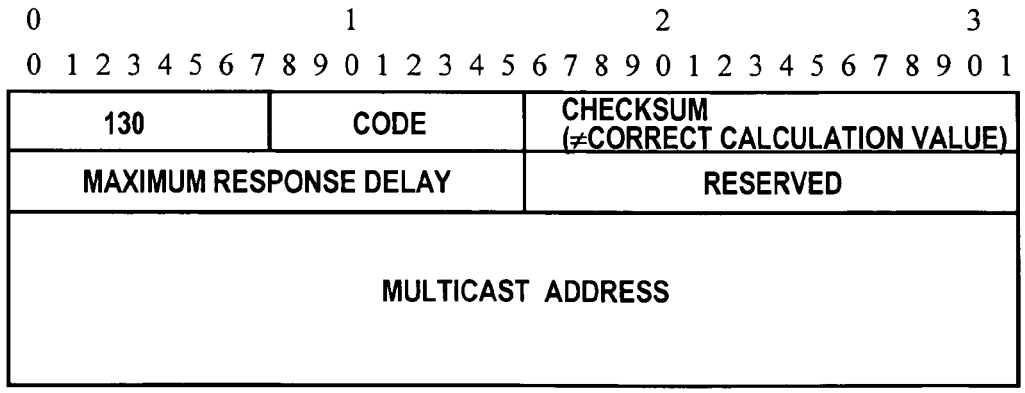
FIG. 4C shows an example of an abnormal Query message.

FIG. 4A shows an example of the MLD message format. An MLD Query message is also similarly judged from the 'Checksum' field. An example of a normal Query message and an example of an abnormal Query message are shown in FIGS. 4B and 4C respectively.

The abnormal message processing unit 132 counts the number of abnormal messages that are input. The count number is output to the router connection state judgment unit 134 as the abnormal message number.

The normal message processing unit 133 counts the number of normal messages that are input and outputs the count number as the normal message number. The normal message processing unit 133 outputs the normal messages to the message transfer unit 135.

The router connection state judgment unit 134 judges whether the bridge device 10 is adjacent to the router 170 from the abnormal message number from the abnormal message processing unit 132 and the normal message number from the normal message processing unit 133. The router connection state judgment unit 134 outputs a bridge ID change instruction to the STP processing unit 14 when it is judged that the bridge device 10 is adjacent to the router 170.

The message transfer unit 135 outputs normal messages from the normal message processing unit 133 to the Query message transmission units 12-1 to 12-n and adds abnormal messages that are output to the Query message transmission units 12-1 to 12-n. The abnormal message is generated as a result of an incorrect calculation value being stored in the 'Checksum' field as shown in FIG. 3C and FIG. 4C.

Further, in this embodiment, the Query message is output to the adjacent devices from a port other than the port receiving the Query message. For example, when the Query message is received by the Query message reception unit 11-1 of port '1', the Query message (normal message and abnormal message) is transmitted from the Query message transmission unit 12-2 of port '2'.

That is, the bridge device 10 in FIG. 1 is connected by port '1' to the router 170, connected by port '2' to the bridge device 20, and connected by port '3' to the bridge device 50, and it is assumed at this point that the path X between the bridge device 10 and bridge device 50 is broken. Here, when the bridge device 10 receives the Query message from the router 170, the bridge device 10 transmits the Query message (normal message and abnormal message) from a port other than port '1' that received the Query message and broken port '3', that is, port '2'.

The STP processing unit 14 changes the bridge ID, for example, bridge priority, to '0' on the basis of the bridge ID change instruction from the router connection state judgment unit 134. That is, the bridge device 10 is set as the root bridge.

FIG. 5A shows the flow of the Query message.

First, the Query message is transferred from the router 170 to the adjacent bridge device 10. The bridge device 10 of this embodiment transfers the transferred normal Query message and the abnormal Query message to the bridge device 20 that is adjacent to the bridge device 10. The bridge device 20 receives both the normal Query message and the abnormal Query message. The bridge device 20 then transfers the normal Query message and abnormal Query message to the adjacent host 120.

As shown in FIG. 5A, the router 170 transfers only the normal Query massage to the adjacent bridge device 10. Further, the bridge device 10 receives only the normal Query message. On the other hand, the bridge device 20 adjacent to the bridge device 10 receives the normal Query message and the abnormal Query message.

Because the bridge device 10 adjacent to the router 170 receives only the normal Query message, when the number of messages is counted, only the normal Query messages are incremented.

On the other hand, the bridge device 20 that is not adjacent to the router 170 but is adjacent to the bridge device 10 receives both the normal and abnormal Query messages from the bridge device 10 and, therefore, when the proportions of the normal messages and abnormal messages transferred from the bridge device 10 are substantially the same, both the normal and abnormal message count numbers are incremented by substantially the same numbers.

Therefore, the router connection state judgment unit 134 of each bridge device 10 or similar can judge whether its own bridge device 10 or similar is adjacent to the router 170 by comparing the number of normal Query messages with the number of abnormal Query messages.

Some kind of error sometimes arises in the transmission line between the router 170 and the bridge device 10 or the like and the Query message is sometimes the abnormal message. In this embodiment, in order to reliably judge whether one's own bridge device 10 is adjacent to the router 170, the number of messages is counted by the router connection state judgment unit 134.

Thus, in this embodiment, the bridge device 10 adjacent to the router 170 is set as the root bridge. According to the STP routing protocol, the farthest path from the root bridge is normally broken and, as shown in FIG. 1, path Y between the bridge device 30 and bridge device 40 is broken.

Therefore, multicast data are transferred from the host 110 to the host 150 by using path X. Accordingly, an efficient data transfer route is generated and the usage efficiency of the network 100 can be improved.

Figure 6:
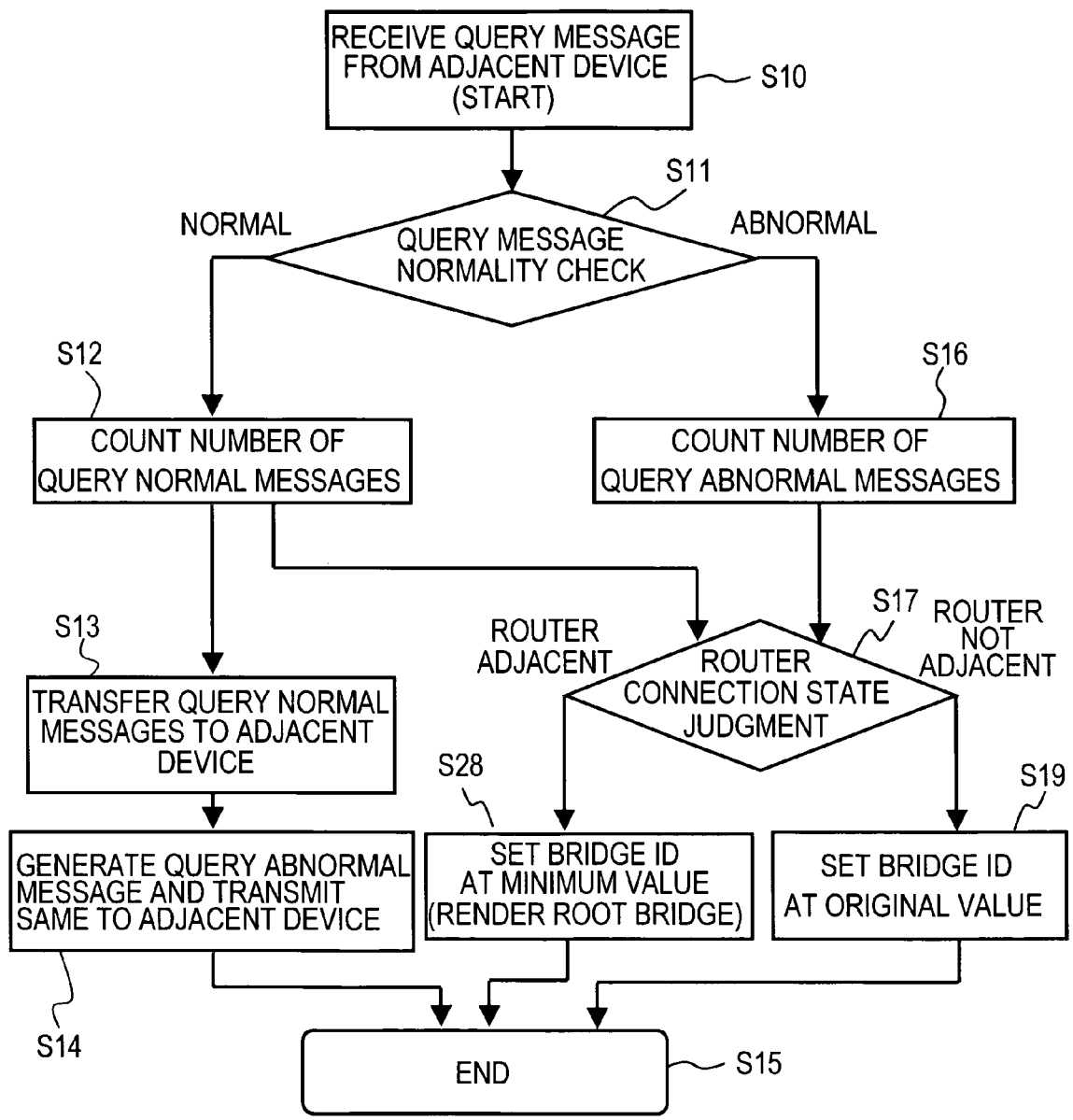
FIG. 6 is an example of a flowchart showing a processing operation.

FIG. 6 is an example of a flowchart showing the processing operation of the bridge device 10. The Query message reception units 11-1 to 11-n of a certain port start processing when the Query message from the adjacent device is received (S10).

Thereafter, the Query massage distribution unit 131 checks the normality of the Query message (S11).

When the Query message is normal ('normal'), the normal message processing unit 133 counts the number of normal Query messages (S12).

Thereafter, the Query message is transferred to the adjacent device by the message transfer unit 135 and the Query message transmission units 12-1 to 12-n (S13).

The message transfer unit 135 then generates the abnormal Query message and transmits the abnormal message to the adjacent device via the Query message transmission units 12-1 to 12-n (S14). The serial processing then ends (S15).

Meanwhile, when it is judged that the Query message is abnormal by the Query message normality check ('abnormal' in S11), the abnormal message processing unit 132 counts the abnormal Query messages (S16).

Thereafter, the router connection state is judged (S17) and, when it is judged that one's own bridge device 10 to 50 is adjacent to the router 170 ('router adjacent' in S17), the router connection state judgment unit 134 outputs the bridge ID change instruction.

The STP processing unit 14 then sets the bridge ID to the minimum value (Bridge Priority is '0', for example) (S18). The serial process then ends (S15).

Further, the processing of the router connection state judgment (S17) is executed after the normal Query messages and abnormal Query messages are counted (S12, S16).

On the other hand, when it is judged by the router connection state judgment that one's own bridge device 10 to 50 is not adjacent to the router 170 ('router not adjacent' in S17), the bridge ID is set to the original value (S19).

The processing of S19 is processing that is assumed when the router 170 has moved to another location. That is, a certain bridge device 10 to 50 is set as the root bridge and when the router 170 then moves to another location, the bridge device 10 to 50 of the root bridge is no longer the root bridge. In this case, the bridge device 10 to 50 is not the root-bridge bridge device and must be restored to the original bridge device ID. In the event of such a situation, the processing of S19 is executed.

The serial processing then ends (S15).

In this example, the message transfer unit 135 transfers the abnormal Query message together with the normal message. However, a newly defined control message other than one's own abnormal Query message may be transferred and it may be judged whether one's own bridge device 10 to 50 is adjacent to the router 170. This judgment is possible because the bridge device 10, which is adjacent to the router 170, does not receive the control message but receives the normal Query message.

A further embodiment will be described next. In the previous example, it was judged whether one's own bridge device 10 to 50 is adjacent to the router 170 by using the abnormal Query message. The following example is an example in which it is judged whether one's own bridge device 10 to 50 is adjacent to the router 170 from actual reception results of a BPDU transferred by snooping between the bridge devices 10 to 50. The network constitutional example is the same the example above (See FIG. 1).

The BPDU is a control packet that is transferred between the bridge devices 10 to 50 for root-bridge selection and path selection and so forth in STP. FIG. 7 shows an example of the format of a transferred BPDU.

As a result of the transmission and reception of the BPDU, the 'bridge ID' contained in the BPDU is compared with those of the bridge devices 10 to 50 and the bridge device 10 to 50 having the smallest value becomes the root bridge. The BPDU is transferred at two second intervals, for example.

The BPDU is sent and received between the bridge devices 10 to 50 but is not transmitted from the router 170 to the bridge devices 10 to 50. In this example, the bridge device 10 is set the rout bridge as the bridge adjacent to the router 170 by this quality.

Figure 8:
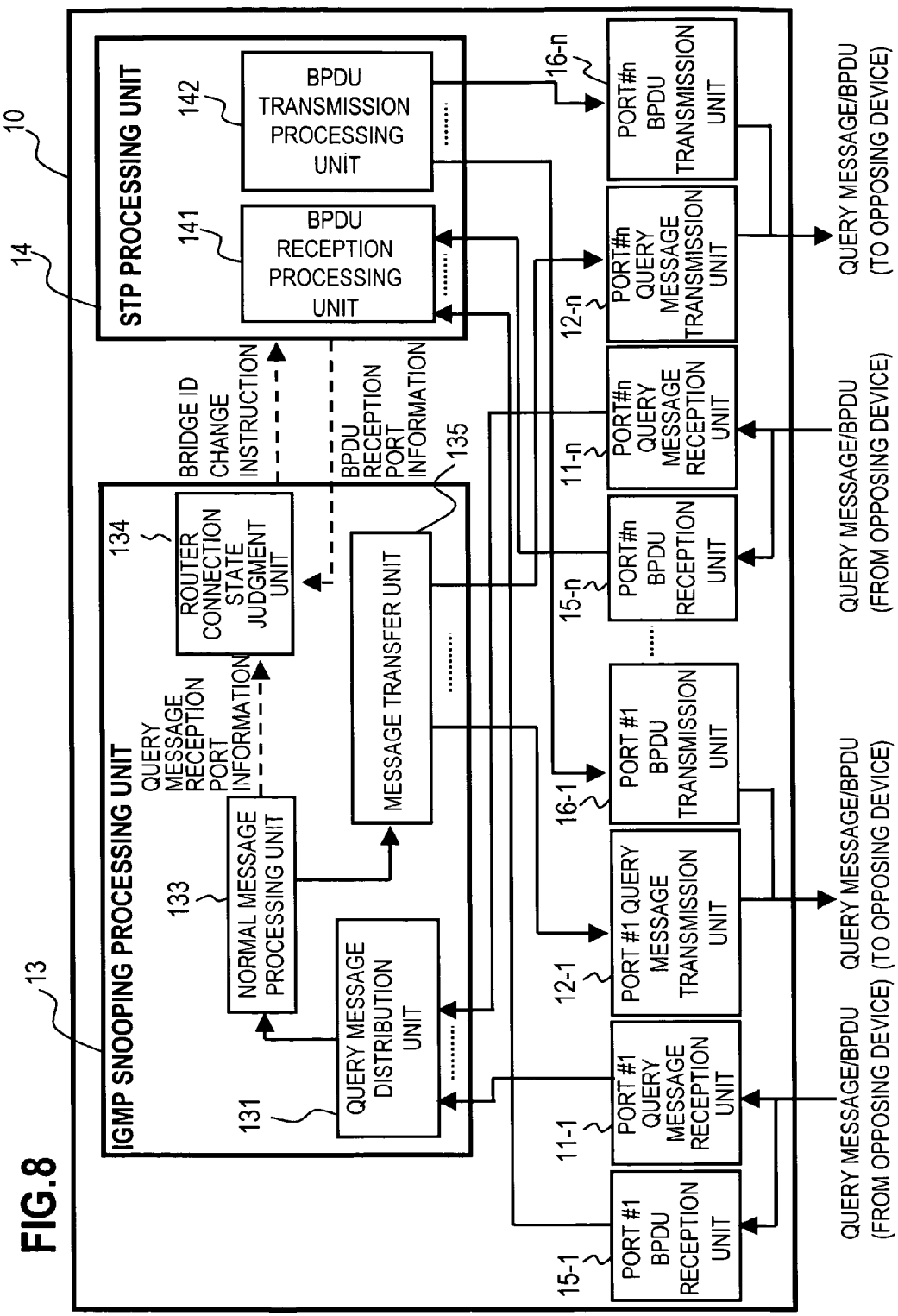
FIG. 8 shows another constitutional example of a bridge device.

FIG. 8 shows a constitutional example of the bridge device 10 of this embodiment. The other bridge devices 20 to 50 also have the same constitution.

The bridge device 10 has Query message reception units 11-1 to 11-n, Query message transmission units 12-1 to 12-n, BPDU reception units 15-1 to 15-n, BPDU transmission units 16-1 to 16-n, an IGMP snooping processing unit 13, and an STP processing unit 14.

The BPDU reception units 15-1 to 15-n, BPDU transmission units 16-1 to 16-n all serve to receive and send the BPDU respectively and exist in each port as in the same case of the Query message reception units 11-1 to 11-n and so on.

The Query message reception units 11-1 to 11-n and Query message transmission units 12-1 to 12-n are the same as in the example of FIG. 2.

The IGMP snooping processing unit 13 has, similarly to the IGMP snooping processing unit 13 in FIG. 2, a Query message distribution unit 131, a normal message processing unit 133, a router connection state judgment unit 134, and a message transfer unit 135. When compared with the example of FIG. 2, this is a constitution in which there is not abnormal message processing unit 132.

The Query message distribution unit 131 judges whether the received Query message is normal or not, and outputs the normal Query message to the normal message processing unit 133. When it is judged that the abnormal Query message has been received, the message is discarded. However, the abnormal Query message of this example differs from that of the previous example in being an abnormal message that is produced as a result of a fault or the like in the transmission line and is not an abnormal message that is intentionally generated.

The normal message processing unit 133 outputs, to the router connection state judgment unit 134, a Query message reception port information indicating the number of the port via which the normal Query message is received.

The STP processing unit 14 has a BPDU reception processing unit 141 and a BPDU transmission processing unit 142. The BPDU reception processing unit 141 is connected to the BPDU reception units 15-1 to 15-n of the respective ports, inputs the received BPDUs, and saves the BPDU actual reception result for each port number.

For example, the STP processing unit 14 saves information such as the fact that the BPDU actual reception result for port number '1' is 'OFF' (the BPDU has not yet been received via port number '1') and that the BPDU actual reception result for port number 'n' is 'ON' (the BPDU has been received via port number 'n'), and so forth.

The BPDU reception processing unit 141 outputs information related to the actual reception results as BPDU reception port information to the router connection state judgment unit 134.

The BPDU transmission processing unit 142 generates the BPDU by storing information required for the BPDU, and so forth, and outputs the BPDU to the BPDU transmission units 16-1 to 16-n. The generated BPDU is output from the BPDU transmission units 16-1 to 16-n.

On the other hand, the router connection state judgment unit 134 of the IGMP snooping processing unit 13 judges whether its own bridge device 10 is a bridge device that is adjacent to the router 170 or not from Query message reception port information from the normal message processing unit 133 and BPDU port information from the STP processing unit 14.

When it is judged that the bridge device 10 is adjacent to the router 170, the outputting of a bridge ID change instruction to the STP processing unit 14 is the same as that described in the previous example.

FIG. 5B shows the flow of the normal Query message and the flow of the BPDU. The normal Query message is transmitted from the router 170 and transferred to the host 120 via the bridge devices 10 and 20. On the other hand, the BPDU is sent and received between the bridge devices 10 and 20.

Therefore, the bridge device 10 adjacent to the router 170 is able to judge the adjacent device is the router 170, when it is confirmed that the normal Query message has been received via a certain port but the BPDU has not been received, from the Query message reception port information and BPDU port information.

Figure 9:
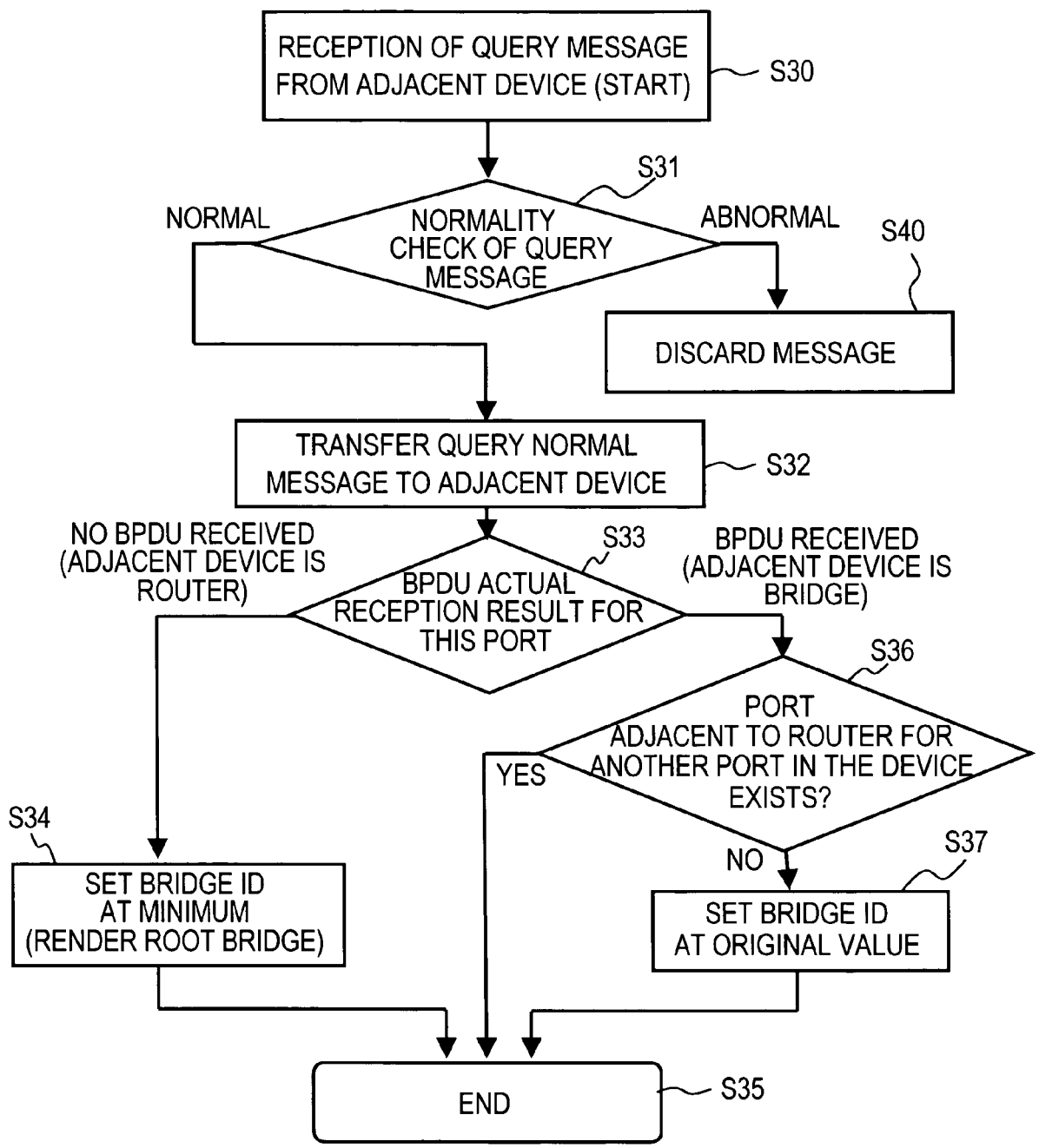
FIG. 9 is an example of a flowchart showing a processing operation.
Figure 10:
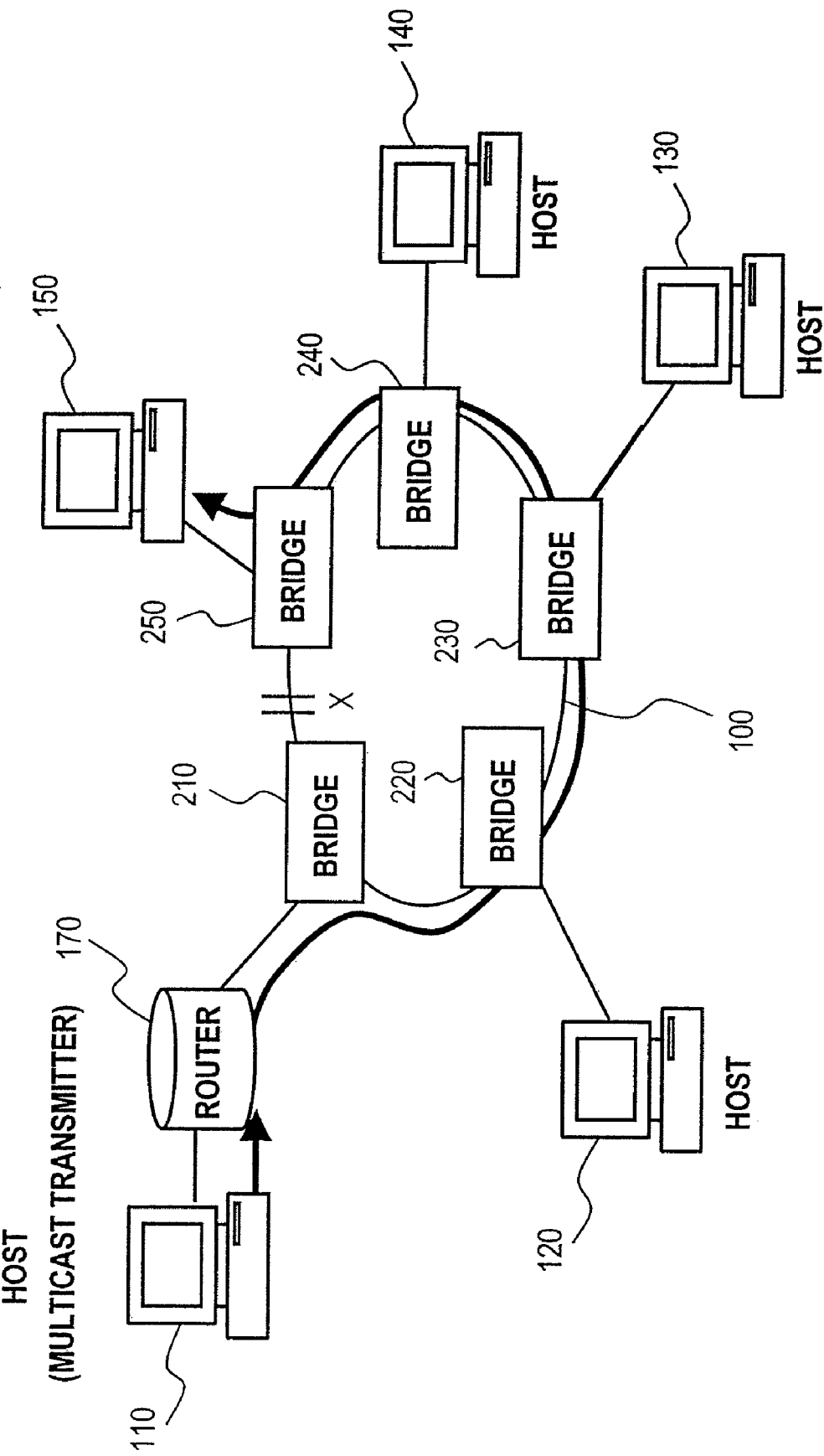
FIG. 10 shows a constitutional example of an entire conventional network.

FIG. 9 is an example of a flowchart showing the processing operation of such the bridge device 10.

The processing is started when the Query message reception units 11-1 to 11-n receive the Query message from the adjacent device (S30).

Thereafter, the Query massage distribution unit 131 checks the normality of the received Query messages (S31). When the Query message is abnormal ('abnormal' in S31), the message distribution unit 131 discards the message.

On the other hand, when the Query message is normal ('normal' in S31), the Query message is transferred from the message transfer unit 135 to the adjacent device via the Query message transmission units 12-1 to 12-n (S32).

Thereafter, the router connection state judgment unit 134 checks the BPDU actual reception result of the relevant port (S33). When the BPDU actual reception result for this port is that no BPDU has been received (in the case of 'no BPDU received'), the router connection state judgment unit 134 judges that one's own bridge device 10 to 50 is a bridge device adjacent to the router 170 and outputs the bridge ID change instruction. The STP processing unit 14 then minimizes the bridge ID (Bridge Priority is then '0', for example) (S34). The serial processing then ends (S35).

On the other hand, when the BPDU actual reception result for this port is that the BPDU has been received (in the case of 'BPDU received' in S33), the router connection state judgment unit 134 judges whether there is a port adjacent to the router 170 for another port or not (S36). The BPDU actual reception result is judged for all the ports.

If a port is adjacent to the router 170 (YES), because the bridge ID has already been minimized in S34, there is no particular processing executed and the serial processing ends (S35).

On the other hand, if a port is adjacent to the router 170 (NO in S36), the bridge ID is set to the original value (S37). This processing is also processing that considers the movement of the router 170 as per the previous example (S19 in FIG. 6). The serial processing then ends (S35).

So too in this example, the bridge device 10 adjacent to the router 170 is set as the root bridge. Further, as shown in FIG. 1, because the longest path Y from the root bridge is broken, an efficient data transfer rate is generated as per the previous example and the usage efficiency of the network 100 can be improved.

Furthermore, so too in any of the earlier examples, because the bridge device 10 adjacent to the router 170 is constituted as the root bridge, a path is formed by a spanning tree algorithm that can be subjected to multicast communications (a topology is formed). A topology that permits efficient multicast communications can be automatically generated in the layer-2 network.

When the bridge device 10 is made the root bridge in the above example, the minimum value is established for the bridge ID by setting the Bridge Priority at '0'. Naturally, if the bridge ID can be minimized, a value other than '0' is possible. For example, the bridge ID (Bridge Priority or the like) of the previously set root bridge is saved in the STP processing unit 14 of the respective bridge devices 10 to 50 and, during the STP processing of this example, the bridge ID can also be minimized by making the bridge ID smaller than the saved bridge ID.

Furthermore, as shown in FIG. 7, the BPDU has the field for storing the 'root ID' and normally stores the bridge ID of the root bridge. That is, the same ID is stored for the 'root ID' and 'bridge ID' of the BPDU transmitted by the root bridge.

For example, implementation can be as per the earlier example by making the ID stored in the 'bridge ID' the unaltered ID of one's own bridge device 10 to 50 and storing a smaller ID than the bridge ID of all the bridge devices in the 'root ID'. The Processing is executed by the BPDU transmission processing unit 142, for example.

Although a bridge device with the 'root ID' does not actually exist, because exactly the same path is generated when the bridge device 10 is made the root bridge, the same results are obtained when the bridge ID is minimized.

Moreover, in the above example, the transfer of multicast data to the network 100 was described. Naturally, in this embodiment, data transfers other than multicast transfers, such as unicast transfers, can also be implemented by the bridge devices 10 to 50 and afford the same operations and effects as the above example.

Furthermore, in the earlier examples, as the basis for judging whether the Query message is normal or abnormal, the judgment is made from the value stored in the 'Checksum' field. For example, a field that indicates whether the Query message is normal or abnormal may otherwise be added additionally by IGMP or MLD. The same operations and effects that can be implemented as per the above example are also afforded in this case.

What is claimed is:

1. A bridge device in a layer-2 network, comprising:
    a setting unit which sets the bridge device as a root bridge by making a bridge ID of the bridge device smaller than the bridge IDs of other bridge devices when the bridge device is adjacent to a router connected to the layer-2 network; and
    a router connection state judgment unit which judges whether or not the bridge device is adjacent to the router by comparing, with respect to a Query message representing a message for confirming whether or not there is participation in a multicast group that is sent by the router, a first reception number indicating the number of normal Query messages received and a second reception number indicating the number of abnormal Query messages received, and which outputs an instruction to change the bridge ID when judged that the bridge device is adjacent to the router.

2. The bridge device according to claim 1, further comprising:
    a message transmission unit which transmits the abnormal Query message together with the normal Query message to the other bridge devices, with respect to the Query message representing a message for confirming whether or not there is participation in a multicast group that is sent by the router.

3. The bridge device according to claim 2, wherein the message transmission unit transmits a control message that is used in order to judge whether or not the bridge device is adjacent to the router, instead of the abnormal Query message.

4. The bridge device according to claim 1, wherein the router connection state judgment unit judges that the bridge device is adjacent to the router when only the first reception number is counted.

5. The bridge device according to claim 1, wherein the router connection state judgment unit judges that the bridge device is not adjacent to the router when the first reception number and the second reception number are counted as having the same count number.

6. The bridge device according to claim 1, further comprising:
    a router connection state judgment unit which judges whether or not the bridge device is adjacent to the router on the basis of the reception history of a BPDU which is transferred between the bridge devices and represents a control packet that stores data including the bridge ID.

7. The bridge device according to claim 6, wherein the router connection state judgment unit receives only a Query message representing a message for confirming whether or not there is participation in a multicast group that is sent from the router and judges that the bridge device is adjacent to the router when the BPDU is not received from the reception history.

8. The bridge device according to claim 6, wherein the router connection state judgment unit judges that the bridge device is not adjacent to the router when both a Query message and the BPDU are received.

9. A layer-2 network, comprising:
    a router; and
    a plurality of bridge devices,
    wherein the bridge device that is adjacent to the router among the plurality of bridge devices is set as a root bridge by making a bridge ID of the bridge device smaller than the bridge IDs of other bridge devices; and
    the bridge device comprising:
        a router connection state judgment unit which judges whether or not the bridge device is adjacent to the router by comparing, with respect to a Query message representing a message for confirming whether or not there is participation in a multicast group that is sent by the router, a first reception number indicating the number of normal Query messages received and a second reception number indicating the number of abnormal Query messages received, and which outputs an instruction to change the bridge ID when judged that the bridge device is adjacent to the router.

10. A bridge device in a layer-2 network, comprising:
    a setting unit which sets the bridge device as a root bridge by storing an ID that is smaller than the bridge IDs of other bridge devices in a region where a root ID of a BPDU is stored when the bridge device is adjacent to a router connected to the layer-2 network; and
    a router connection state judgment unit which judges whether or not the bridge device is adjacent to the router by comparing, with respect to a Query message representing a message for confirming whether or not there is participation in a multicast group that is sent by the router, a first reception number indicating the number of normal Query messages received and a second reception number indicating the number of abnormal Query messages received, and which outputs an instruction to change the bridge ID when judged that the bridge device is adjacent to the router.

11. A layer-2 network, comprising:
    a router; and
    a plurality of bridge devices, wherein the bridge device that is adjacent to the router among the plurality of bridge devices is set as a root bridge by storing an ID that is smaller than the bridge IDs of other bridge devices in a region where a root ID of a BPDU is stored, wherein
    the bridge device comprising:
        a router connection state judgment unit which judges whether or not the bridge device is adjacent to the router by comparing, with respect to a Query message representing a message for confirming whether or not there is participation in a multicast group that is sent by the router, a first reception number indicating the number of normal Query messages received and a second reception number indicating the number of abnormal Query messages received, and which outputs an instruction to change the bridge ID when judged that the bridge device is adjacent to the router.

* * * * *